United States Patent
Demma

(10) Patent No.: US 8,231,165 B2
(45) Date of Patent: Jul. 31, 2012

(54) MOTOR VEHICLE WITH WINDSCREEN, SEPARATE ROOF SCREEN AND PULL-OUT ROLLER BLIND

(75) Inventor: Dino Demma, Rüsselheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/860,241

(22) Filed: Aug. 20, 2010

(65) Prior Publication Data

US 2011/0042996 A1 Feb. 24, 2011

(30) Foreign Application Priority Data

Aug. 20, 2009 (DE) .......... 10 2009 038 185

(51) Int. Cl.
*B60J 1/20* (2006.01)
(52) U.S. Cl. ............ 296/97.8; 296/214
(58) Field of Classification Search ........... 296/214, 296/97.8
See application file for complete search history.

(56) References Cited

U.S. PATENT DOCUMENTS

| | | | | |
|---|---|---|---|---|
| 6,857,693 | B2 * | 2/2005 | Hattass et al. | 296/214 |
| 7,029,057 | B2 * | 4/2006 | Izabel et al. | 296/152 |
| 7,059,651 | B2 * | 6/2006 | Bohm et al. | 296/97.11 |
| 2003/0006630 | A1 * | 1/2003 | Kralik et al. | 296/214 |

FOREIGN PATENT DOCUMENTS

| | | |
|---|---|---|
| DE | 19745866 C1 | 12/1998 |
| DE | 10101491 C1 | 5/2002 |
| DE | 10244156 A1 | 4/2004 |
| DE | 10245246 A1 | 4/2004 |
| DE | 202004001725 U1 | 6/2004 |
| DE | 10360629 A1 | 7/2005 |
| DE | 102005017914 A1 | 10/2006 |
| DE | 60124162 T2 | 9/2007 |
| DE | 102008017197 A1 | 10/2009 |
| DE | 102008017198 A1 | 10/2009 |
| EP | 1440830 A1 | 7/2004 |
| FR | 2890335 A1 | 3/2007 |
| GB | 2459359 A | 10/2009 |
| JP | 2128620 A | 5/1990 |

OTHER PUBLICATIONS

British Patent Office, British Search Report for British Application No. 1013115.9, Nov. 11, 2010.

* cited by examiner

*Primary Examiner* — Joseph Pape
(74) *Attorney, Agent, or Firm* — Ingrassia Fisher & Lorenz, P.C.

(57) ABSTRACT

A motor vehicle is provided with a windscreen, a pull-out roller blind, more preferably sun roller blind, for covering this windscreen and a roof screen separate from the windscreen in the roof of the motor vehicle. The pull-out roller blind is also provided for covering the roof screen.

11 Claims, 4 Drawing Sheets

MOTOR VEHICLE WITH WINDSCREEN, SEPARATE ROOF SCREEN AND PULL-OUT ROLLER BLIND

CROSS-REFERENCE TO RELATED APPLICATION

This application claims priority to German Patent Application No. 102009038185.6, filed Aug. 20, 2009, which is incorporated herein by reference in its entirety.

TECHNICAL FIELD

The technical field relates to a motor vehicle with a windscreen, a roof screen separate from the windscreen and a pull-out roller blind, more preferably sun roller blind.

BACKGROUND

Motor vehicles with front or windscreen and transparent roof screens separated from this through a roof part of the vehicle are generally known. For example from DE 102 45 246 A1, DE 103 60 629 A1 or the own not pre-published German patent applications DE 10 2008 01 7197.2 motor vehicles with so-called panorama screens, i.e. interconnected continuous windscreens and roof screens that can be covered by a common sun roller blind are known. With the known motor vehicles with windscreen and separate roof screen however two independent sun roller blinds are provided to date for darkening these.

At least one object of the present invention is to improve a generic motor vehicle with a windscreen and a separate roof screen. In addition, other objects, desirable features, and characteristics will become apparent from the subsequent summary and detailed description, and the appended claims, taken in conjunction with the accompanying drawings and this background.

SUMMARY

According to an embodiment of the invention, it is proposed to utilize a continuous roller blind, more preferably a sun roller blind, for the at least partial covering of both the roof screen as well as of the windscreen. To this end, a motor vehicle according to an embodiment of the present invention with a windscreen and a separate roof screen separated from the windscreen through a roof part of the motor vehicle or a separate glass roof comprises a pull-out roller blind which is provided for the at least partial covering of the windscreen and also for the at least partial covering of the roof screen.

Because of this, the expenditure that was required in the past by two separate roller blinds for windscreen and roof screen can be advantageously reduced. At the same time, the vehicle interior space can also be improved visually and ergonomically by a continuous roller blind.

The roller blind can serve for the partial or complete covering of the roof screen to protect from solar radiation from above and at least for the partial covering of the windscreen in order to protect the driver from glare in the upper field of vision of the windscreen. In a preferred embodiment the roller blind is provided for the optional substantially complete covering of the windscreen in order to provide shade for the interior of a parked vehicle and thus more preferably reduce it being heated up through solar radiation.

Windscreen and/or roof screen are preferentially transparent screens, more preferably of glass, wherein transparent more preferably means also at least partially tinted screens which can be (further) darkened by means of the roller blind.

In a preferred embodiment a roller blind cylinder is arranged on the side of the roof screen facing away from the windscreen. It can more preferably be integrated or accommodated in or behind a roof headlining. Here, the roller blind cylinder can comprise an integrated return spring.

Preferentially, one or a plurality of guiding devices for guiding the roller blind, more preferably of a pulling member on an in pull-out direction front end of the roller blind are provided. A guiding device can more preferably comprise one or a plurality of rails in which lateral edges of the roller blind, guide slides or bodies and/or a pulling member are displaceably guided positively, for example in a sliding manner or via rolling bodies such as more preferably guide wheels.

A guiding device can be designed for guiding the roller blind in the region of the roof screen, the windscreen and/or of the roof part of the motor vehicle separating the two screens. In a preferred embodiment the guiding device for guiding the roller blind is formed in the region of the roof screen and the roof part so as to guide the pulled-out roller blind preferentially running substantially horizontally there and secure it to prevent sagging into the passenger compartment, while in more preferably the lower region of the windscreen if applicable it can also be free, since in that location it only serves for shading the parked vehicle and in addition it can be tautened through locking between an in pull-out direction front end and the guide in the region of the roof part. The roller blind can also be lockable in other positions, more preferably in at least one anti-glare position covering the upper region of the windscreen.

In order to reduce sagging of the pulled-out roller blind, more preferably of a flexible roller blind, one or a plurality of support members for supporting the at least partially pulled-out roller blind against the windscreen and/or roof screen are provided in a preferred embodiment, wherein one or a plurality of support members is moveably guided on the screen relative to the roller blind, for example in the same guiding device as the roller blind or a guiding device separate from this. Such support members can for example consist of plastic, fiber composite material and/or metal and/or comprise a circular, rectangular or oval cross section.

In a preferred embodiment the length of one or a plurality of support members is variable in extension or vehicle transverse direction. This can be realized for example through elastic deformation of the support member and/or through displacing of parts of a multi-part support member, preferentially against an elastic preload which tends to reset said support member in a reference length. In this manner the support members can also be guided in non-parallel guide rails on a screen, for example of a trapezium-shaped windscreen.

In a preferred embodiment one or a plurality of support members can be coupled or are coupled with the roller blind in push-in and/or pull-out direction more preferably via a drag mechanism. This can for example comprise hooks and/or magnets.

Preferentially, such support members can be moved in to the field of vision of a screen through pulling-out of the roller blind, preferentially offset relative to this pull-out movement, and support the roller blind there. In addition or alternatively support members can be moved out of the primary field of vision of this screen preferentially through pushing-in of the roller blind preferentially connected positively with said roller blind, so as not to impair it if not required.

The drag mechanism can be decouplabled so that the support member, moved, more preferably dragged along by the pulled-out roller blind, is decoupled from the latter in a predetermined position and remains in the predetermined position until it is again taken along by the roller blind when the latter is pushed in. For decoupling, one or a plurality of impact blocks, magnets, couplings, cable guides or the like can be provided. More preferably, a plurality of predetermined decoupling positions can be provided for a plurality of support members of a roller blind.

In the same manner, one or a plurality of support members can be adjustable in a guide rail relative to the screen, more preferably at least in pull-out direction also independently of the roller blind, manually or motor-driven, for example via at least one pull cable, push cable, gear and/or a moveable slide. Preferably, these are automatically adjusted in predetermined positions preferentially dependent on the pull-out length of the roller blind.

Preferably the roller blind has a predetermined opacity, preferably at least 25% opacity, more preferably at least 50% opacity, preferentially substantially 100% opacity, wherein opacity can be defined as for example the quotient of the luminous intensity, measured for example in candela [cd], luminance, measured for example in [cd/m$^2$], luminous flux, measured for example in lumen, quantity of light, for example measured in lux, behind the roller blind divided by the corresponding quantity in front of the roller blind.

In order to prevent that the roller blind is inadvertently pulled out too far while travelling, a more preferably electrically, mechanically, pneumatically or hydraulically operable latch or stop can be provided which with ignition switched on limits the roller blind travel and can more preferably be arranged in one or a plurality of guide rails of the roller blind.

In addition or alternatively a motor drive of the roller blind can be provided, which can move the roller blind in a guide rail for example by way of at least one pull cable, push cable, gear and/or a moveable slide. Such a drive can preferentially be suitably activated to limit the roller blind travel. A drive can also move the roller blind automatically, for example when closing a vehicle locking device, in to a shading position in which it covers the roof and windscreen as far as possible or, conversely, when opening the vehicle, in to an anti-glare position, in which only a part of the windscreen, only the roof screen, only a part of the roof screen or none of the two screens are covered. In a preferred embodiment a corresponding drive control is coupled with a sensor, more preferably a photo, solar or temperature sensor and based on signals from such sensor, predetermines a position of the sun roller blind, for example greater covering in the case of more intense solar radiation or higher vehicle interior temperature.

More preferably, when the roller blind preferentially continuously extends substantially over the entire width of at least one screen to be covered, this can result in problems with an inside rear view mirror positioned in the pull-out path of the roller blind on the headlining of the vehicle. In addition to an at least partially slit roller blind a visual system with a camera and a monitor for producing an image of a rear space behind the motor vehicle captured by the camera is conceivable as remedy. The camera is preferentially arranged in the rear region of the vehicle, preferably at the highest point of the rear, the monitor on or in the instrument panel of the vehicle. In a preferred embodiment the camera can be swiveled and thus advantageously also serve as reverse parking aid. More preferably, swiveling of the camera can be activated through the engaging of a reverse gear. In a preferred embodiment the camera is activated by the driver, for example via a switch on the steering wheel, which can switch itself off again after a predetermined time. Preferentially it substantially captures the complete 180° range behind the vehicle, which reduces blind spot regions. The monitor can be utilized to display additional information, more preferably of a navigation system.

BRIEF DESCRIPTION OF THE DRAWINGS

The present invention will hereinafter be described in conjunction with the following drawing figures, wherein like numerals denote like elements, and:

FIG. 1 the front upper interior region of a motor vehicle according to an embodiment of the present invention in lateral section with sun roller blind pushed in;

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
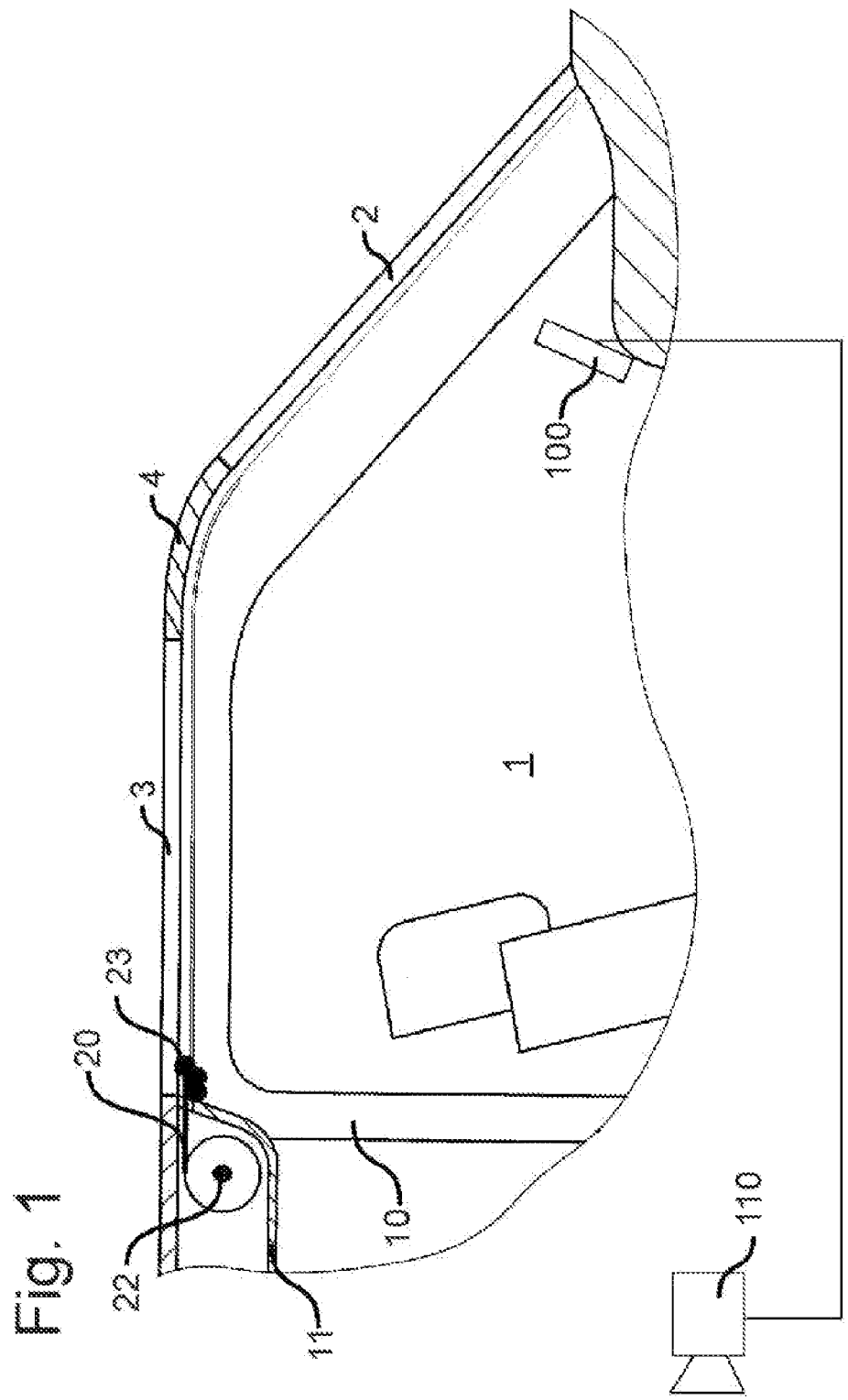

FIG. 1 shows the front upper interior region of a motor vehicle 1 in section from the side according to an embodiment of the present invention with a conventional windscreen 2, a separated roof screen 3 and a roof part 4 separating these.

For darkening the roof screen 3, optionally also as anti-glare feature for the occupants during driving and for the complete darkening of the windscreen 2 or shading of the vehicle interior during vehicle stoppage, a continuous sun roller blind 20 with two freely moveable support members 21a, 21b (see FIGS. 2 to 4) is provided.

A roller blind cylinder 22 of the sun roller blind 20 is located under a headlining cover 11 in the region of the roof between the A-pillar and the C-pillar 10. The cylinder 22 like the one-piece sun roller blind 20 is continuous in vehicle transverse direction (perpendicularly to the drawing plane of the Fig.).

In the in pull-out direction front part of the sun roller blind 20 a pull member 23 is arranged, which is connected with the flexible for example textile roller blind material in a fixed manner and positively guided in guide rails which are positioned laterally of the roof screen 3 and under the roof part 4 reach as far as to an upper edge of the windscreen 2.

Under the sun roller blind, i.e. closer to the vehicle interior, two support members 21a, 21b extend in the exemplary embodiment. The support members 21a, 21b with their two end faces are each positively guided in the guide rails in which the pull member 23 is also guided. With these, an in pull-out direction front support member 21a is releasably coupled via a drag mechanism in form of a plurality of permanent magnet pairs, which in turn is coupled with an in pull-out direction rear support member 21b via a drag mechanism in form of elastic hooks. In addition, the rear support member 21 is tied to the cylinder 22 with cable controls of predetermined pull-out length in the guide rails which are not shown.

Figure 2:
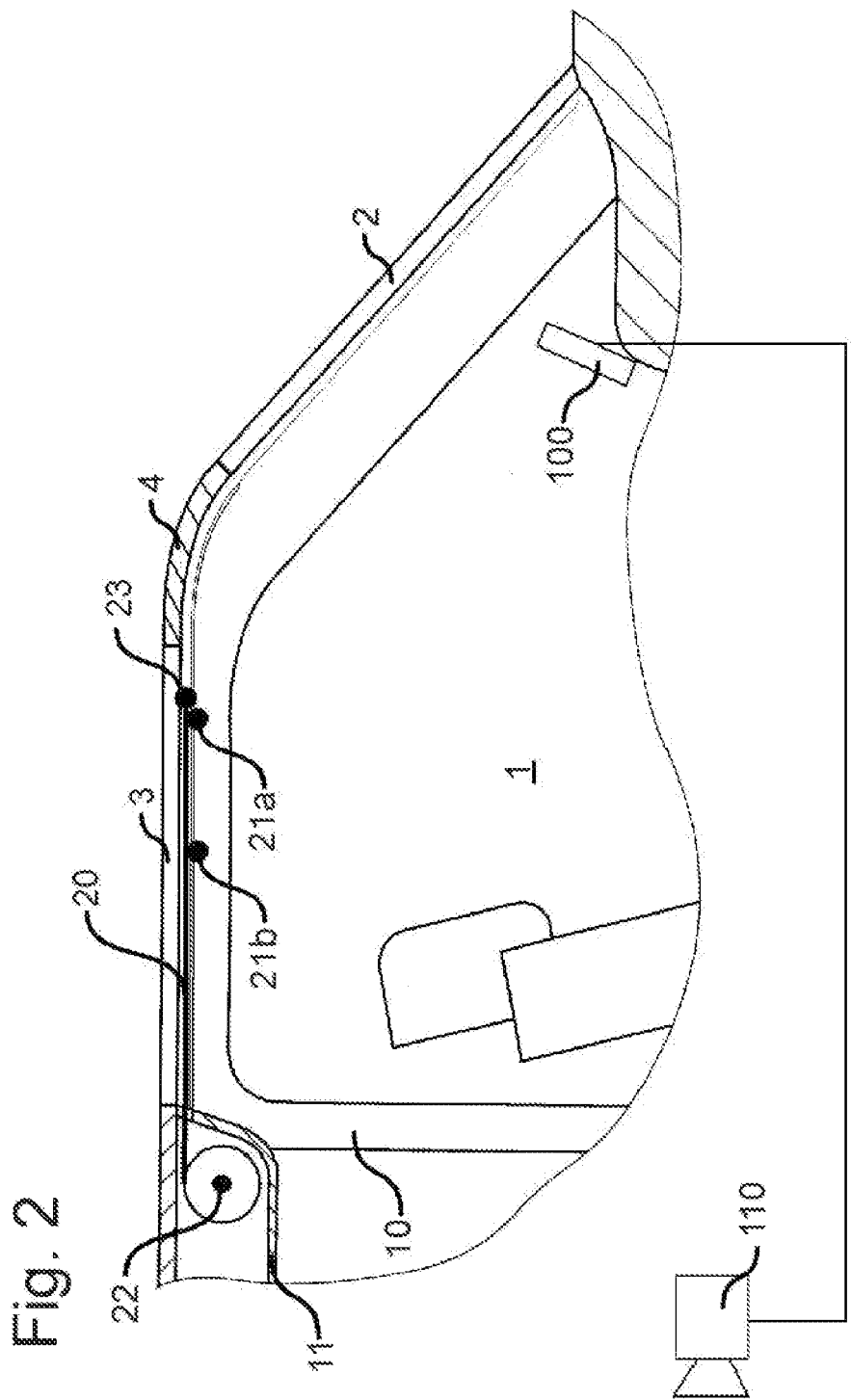
FIG. 2 the motor vehicle from FIG. 1 with partially pulled-out sun roller blind in a roof darkening position.

If the sun roller blind 20 (see FIG. 1) completely wound on to the roller blind cylinder 22 or pushed behind the headlining cover because of an integrated return spring (not shown) is initially pulled out into a roof darkening position shown in FIG. 2 manually or motorically via an actuator with cable control in a motor-driven manner, the pull member 23 takes the coupled support members 21a, 21b along in the guide rails. Here, the cable controls, which tie the rear support member 21*b* to the cylinder 22, unwound in the process reach their predetermined pull-out length and prevent further movement of this support member 21*b* along with the pull member 23 and the front support member 21*a*. Accordingly, the hook connections are released under the elastic deformation of the hooks and the rear support member 21*b* decoupled from the front support member 21*a* remains in the position predetermined by the pull-out length of the cable controls (see FIG. 2), in which it tautens the sun roller blind 20 approximately in the middle of the roof screen 3 against its inner side and limits or prevents sagging into the passenger interior.

Figure 3:
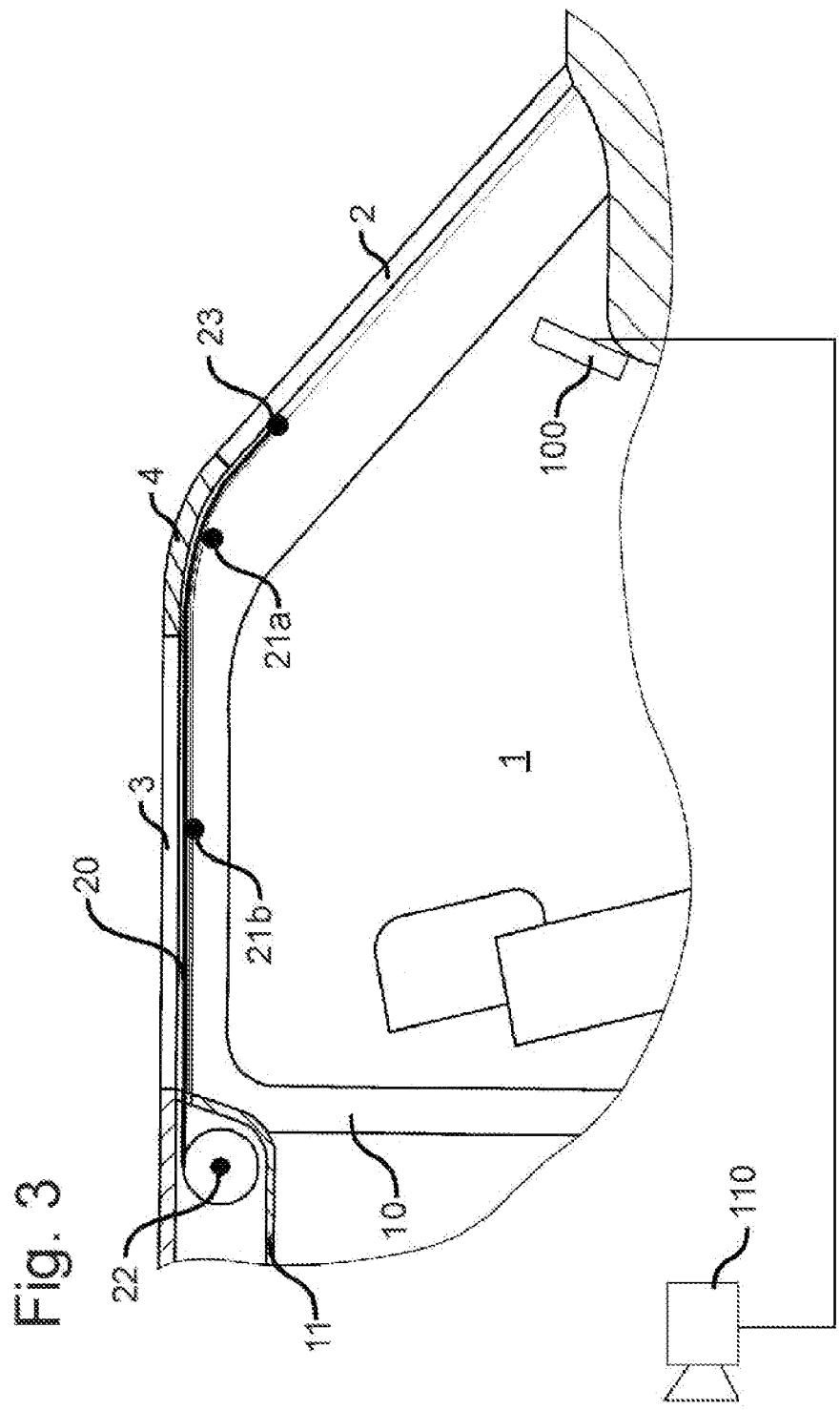
FIG. 3 the motor vehicle from FIG. 1 with further pulled-out sun roller blind in an anti-glare position.

If the sun roller blind 20 is pulled out and locked in an anti-glare position shown in FIG. 3 in which it additionally covers an upper field of vision of the windscreen 2, the pull member 23 takes the front support member 21*a* coupled to it along in the guide rails until it strikes impact blocks (not shown) and its continued onward movement is prevented by these, so that the permanent magnet pairs are released and the decoupled support member 21*a* remains in the region of the roof part 4 in order to tauten the sun roller blind 20 against the roof part 4.

Figure 4:
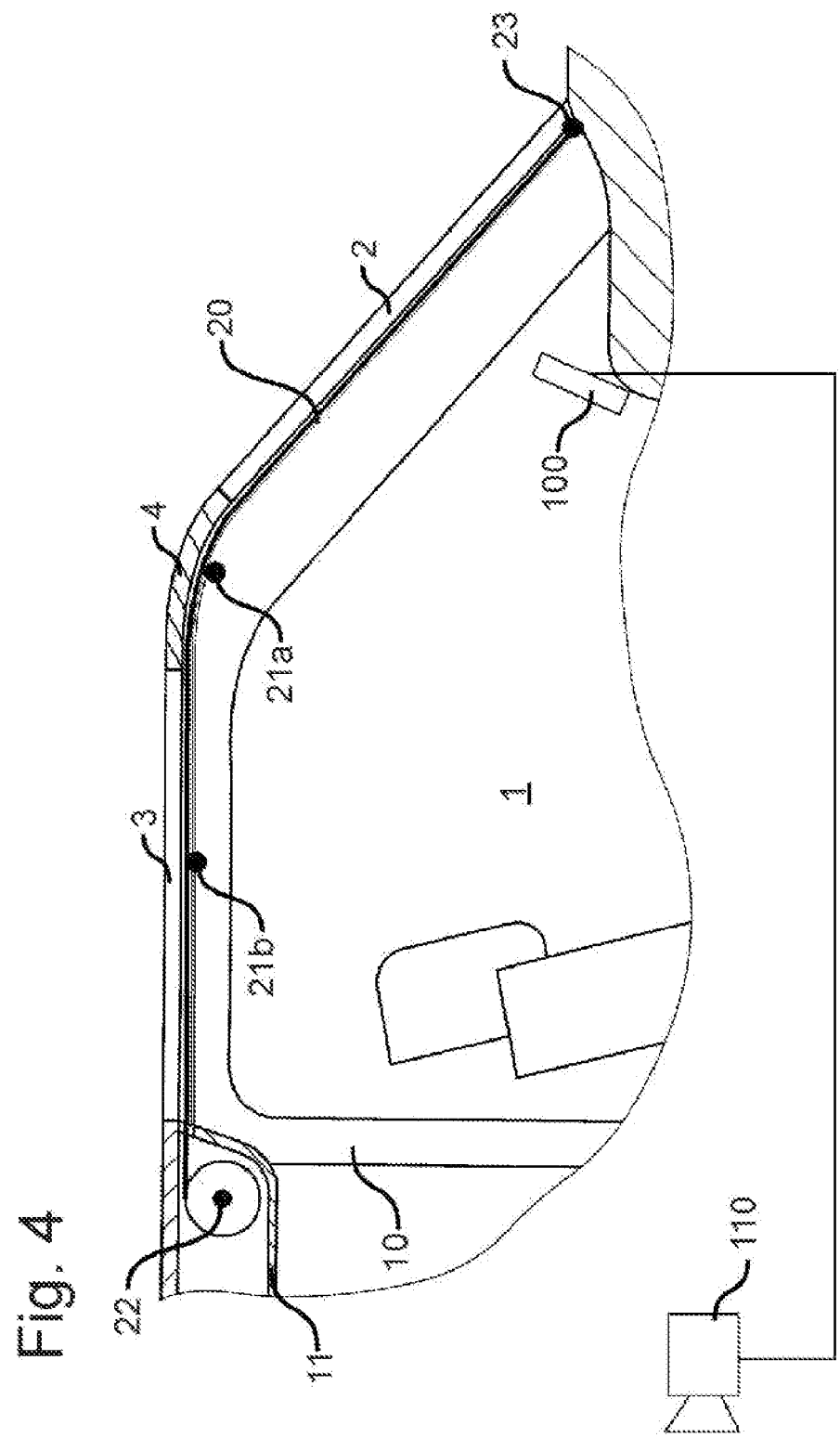
FIG. 4 the motor vehicle from FIG. 1 with completely pulled-out sun roller blind in a shading position.

The sun roller blind 20 can be additionally pulled out and locked in a darkening position shown in FIG. 4, in which it shades the interior space of the parked vehicle. Locking, even in intermediate positions which are not shown, in which for example the roof screen 3 is only partially covered, can for example be effected through clamping, engaging or fixing of a motor drive.

If conversely the pull member 23 is moved back into the anti-glare position (FIG. 3), the roof darkening positioning (FIG. 2) or the position behind the headlining cover 11 (FIG. 4→FIG. 3→FIG. 2→FIG. 1), the pull member 23 takes the support members 21*a*, 21*b*, along subject to the closing of the permanent magnet pairs or the hook connections, so that these do not impair the field of vision of the windscreen 2 and the roof screen 3.

In an alternative embodiment one or both support members 21*a*, 21*b* are not coupled to the pull member 23, but adjustable in a separate rail manually or motorically independently of the pull member 23 in order to for example be moved into optimal automatically predetermined support positions. For example, such support positions can be located in the region of the middle of the roof screen 3 (see FIG. 2) or the roof part 4 (see FIG. 4) and optimally support the sun roller blind 20 there.

In a manner which is not shown in more detail the front support member 21*a* is designed variable in its length (perpendicularly to the drawing plane of FIG. 1 to FIG. 4), for example in two parts, wherein the one part partially engages over the other part for example quill-like and is elastically coupled with said other part, for example via an interior spring. When pulled down in the lateral guide rails which, because of a trapezium shape of the roof part 4 do not run parallel, the two-piece support member 21*a* guided in these rails lengthens under the tension of its interior spring and can thus be pushed also in regions of different guide rail spacings. When pushed in, the support member 21*a* is again pulled back to its original length by the interior spring.

Since the sun roller blind 20 is designed continuously from the one to the other vehicle side, an interior rear view mirror on the roof part 4 would be in the way of the sun roller blind pulled out into the anti-glare position (FIG. 3) or beyond. For this reason, said mirror is replaced with a monitor 100 in the instrument panel of the motor vehicle 1 and a camera 110 connected to said monitor, which camera is arranged at the highest point of the vehicle rear and capable of being swiveled horizontally and/or vertically. This camera can additionally serve as reverse parking aid and to this end be activated on engaging of the reverse gear. If it is utilized in place of the interior rear-view mirror and to this end is activated for example by the driver by means of a button on the steering wheel, it can substantially capture the entire rear space behind the motor vehicle 1, so that blind spot regions are reduced or avoided. Following a predetermined time the camera can switch itself off again so that on the monitor other information for example of a navigation system can be displayed in place of the camera image.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle having a roof, comprising:
   a windscreen;
   a roof screen located in the roof of the motor vehicle, the roof screen separated from the windscreen by a roof part in the roof of the motor vehicle; and
   a roller blind assembly for the roof screen and the windscreen, the roller blind assembly comprising:
      a continuous and unitary pull-out roller blind;
      a pull member connected to a front part of the pull-out roller blind;
      a rear support member for the pull-out roller blind, the rear support member adapted to be coupled to and decoupled from the pull-out roller blind in response to movement of the pull-out roller blind; and
      a front support member for the pull-out roller blind, the front support member adapted to be coupled to and decoupled from the pull-out roller blind in response to movement of the pull-out roller blind;
   wherein movement of the pull-out roller blind from a completely wound position to a roof darkening position covering the roof screen is associated with movement of the rear support member toward the windscreen and to a predetermined position where the rear support member is decoupled from the pull-out roller blind and where further movement of the rear support member is prevented, and is associated with movement of the front support member and the pull member toward the windscreen;
   wherein movement of the pull-out roller blind, from the roof darkening position past the roof part to an anti-glare position covering the roof screen and the roof part, is associated with movement of the front support member toward the windscreen and to a region of the roof part where the front support member is decoupled from the pull-out roller blind and where continued onward movement of the front support member is prevented, and is associated with movement of the pull member toward the windscreen; and
   wherein movement of the pull-out roller blind, from the anti-glare position to a darkening position covering the roof screen, the roof part, and the windscreen, is associated with movement of the pull member past the windscreen.

2. The motor vehicle according to claim 1, wherein the pull-out roller blind is a sun roller blind.

3. The motor vehicle according to claim 1, further comprising a roof headlining cover, wherein the pull-out roller blind is integrated in the roof headlining cover.

4. The motor vehicle according to claim 1, wherein the pull-out roller blind is accommodated behind a roof headlining cover.

5. The motor vehicle according to claim 1, wherein the pull-out roller blind is adapted to lock in the anti-glare position, and is adapted to lock in the roof darkening position.

6. The motor vehicle according to claim 1, wherein the pull-out roller blind extends over substantially the entire width of the roof screen.

7. The motor vehicle according to claim 1, wherein the pull-out roller blind has a predetermined opacity of at least 25% opacity.

8. The motor vehicle according to claim 1, wherein the pull-out roller blind has a predetermined opacity of at least 50% opacity.

9. The motor vehicle according to claim 1, wherein the pull-out roller blind has a predetermined opacity of substantially 100% opacity.

10. The motor vehicle according to claim 1, wherein the pull-out roller blind is flexible.

11. The motor vehicle according to claim 1, further comprising a visual system with a camera and a monitor adapted to display an image of a rear space behind the motor vehicle captured by the camera.

* * * * *